Nov. 3, 1959     ANDREW J. TOTI     2,910,722
FOWL PICKER AND METHOD
Filed May 22, 1953
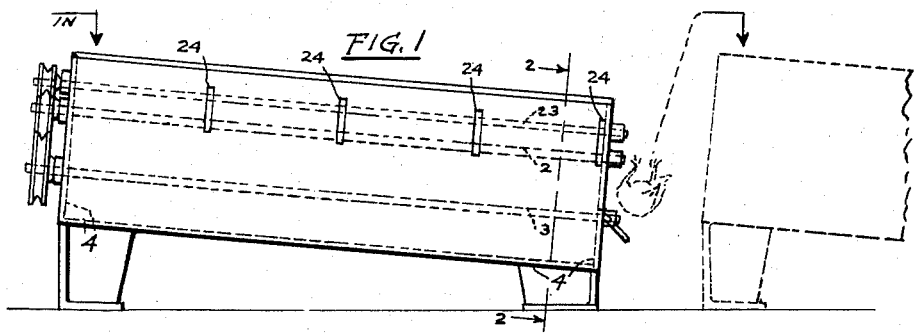
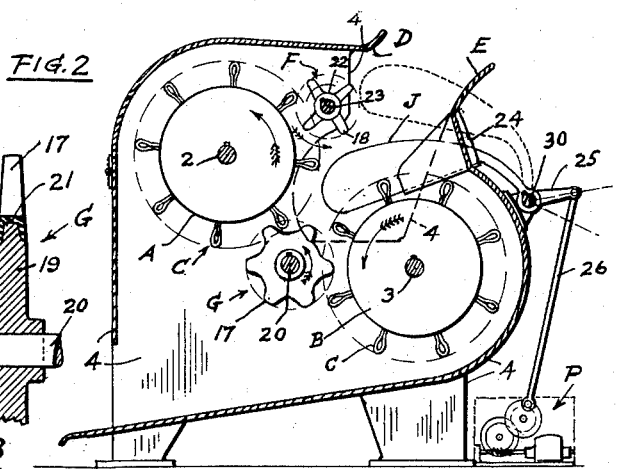
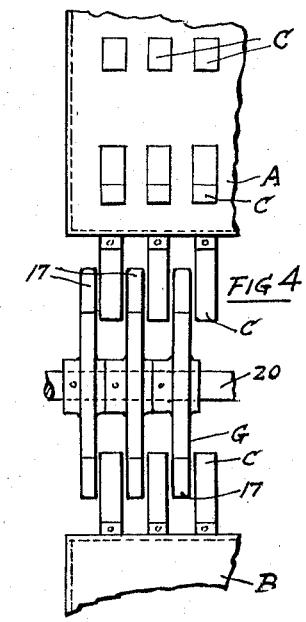
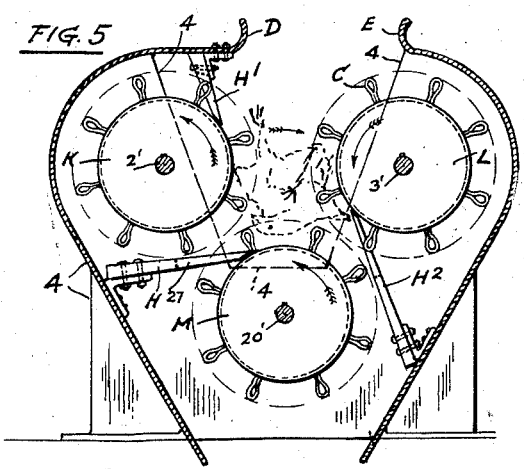
INVENTOR.
ANDREW J TOTI
BY
Atty.

United States Patent Office 2,910,722
Patented Nov. 3, 1959

2,910,722
FOWL PICKER AND METHOD

Andrew J. Toti, Modesto, Calif., assignor to Honolulu Oil Corporation, a corporation of Delaware Application May 22, 1953, Serial No. 356,654

9 Claims. (Cl. 17—11.1)

The invention relates to the defeathering of fowl and particularly to a novel fowl picker wherein the fowl are supported by or "ride" freely upon and are tumbled about upon the fast moving picking elements, and kept tumbling in every direction rapidly, so as to expose every part of the fowl to the frictional striking and rubbing action of the picking elements.

The principal object of the invention is to provide a practicable method for picking the feathers from fowl, involving the above principle or method and apparatus for carrying it out. Another object is to provide a method and apparatus of this kind which will entirely do away with the suspension of the fowl or the supporting of the fowl on traveling conveyors during the picking operation, and which will result in more completely picked fowl than heretofore mechanically produced, and avoid the use of hand finishing.

Other objects and advantages of the invention will appear in the following description:

The accompanying drawings illustrate some of the various forms of apparatus by which the novel method may be successfully carried out.

In the drawings—

Fig. 1 is a general view in side elevation of a fowl picker embodying the details of Fig. 2.

Fig. 2 is an enlarged cross section of Fig. 1 taken along the line 2—2 thereof showing the arrangement of the revolving drum like members upon which the picking and stripping elements are mounted or carried.

Fig. 3 is an enlarged cross section of the lower rotary stripper of Fig. 2.

Fig. 4 is an enlarged development view showing the operative relation of the lower stripper elements to the drums and their picking elements.

Fig. 5 is a cross section of a machine similar to that of Fig. 2 but shown with stationary comb-like strippers instead of the rotary strippers of Fig. 2.

Fig. 6 is a detail of a portion of one of the comb strippers of Fig. 5.

Before describing the drawings in detail it will make the understanding of them easier to briefly explain the nature of and operation of the machine as follows:

In the form shown herein the machine comprises a pair of revolvably mounted picking drums A and B studded with projecting soft flexible frictional feather engaging elements C. These drums are adjacent and extend laterally, preferably at a downward inclination, and the fowl to be picked are introduced at one end of and travel along to fall off of the opposite end of the drums all the while supported on and riding along upon the fast moving picking elements carried by the drums.

The fowl are caused to turn and tumble in every direction by the action of the rotating picking elements and frequently sometimes lifted bodily into the air and are guided to fall onto the picking drums by a wall or walls D, E, extending along the drums. As the fowls are themselves twisting and turning about in every direction rapidly so as to open and extend their wings and legs, the action of the fast rotating picking elements against their bodies, legs, wings, and neck reaches everywhere from comb to toes and is far different than the action of prior apparatus in common use wherein the "fingers" or beaters strike against a suspended fowl and where some parts of the fowl are necessarily shielded by the wings, legs, and other parts.

To prevent the fowls from being caught between or wound about the drums, either rotary strippers or fixed combs are provided and the relation of the speeds of the drums are preferably adjusted to eliminate such action. Such rotary strippers are designated F and G, and stationary comb strippers H, $H^1$ and $H^2$.

The machine may be made short to handle from one to three chickens at a time for removal when finished, or for a few seconds treatment and discharge into another similar machine for further treatment in succession, or the machine may be long enough and inclined sufficiently for the fowls to be passed in a constant stream of about one fowl per second or two to pass once through the machine and emerge completely finished, while another arrangement shown in the present drawings provides a medium length machine long enough to finish young chickens in one passage through, but provided with a gate J at the outlet end to hold the fowl all in the machine for a few seconds longer than normal and then open to let them fall out while a new lot of fowl are entering, and the gate closes to similarly hold back the new lot.

This latter arrangement is made to allow for continuous introduction of fowls to the machine at about one a second or two by the use of several gates J, spaced along the machine as at 24 in Fig. 1, and which automatically open and close all together at short intervals, depending on the increased time desired for the particular fowls being treated. Such gates would seem to interfere with the fowl passing along but in practice do not do so as the fowl move away if the gates strike them. Some or all of the gates may be left open or removed in adjusting the desired length of treatment time.

In the drawings the showing is confined to the novel features, and conventional features such as any suitable transmission such as motors, belts, pulleys, gears, etc., which may be applied in many different ways to secure the rotation speeds, and directions of rotation indicated in the drawings, are generally omitted for clarity, but will be shown in additional drawings if wanted.

The drums A and B may be of any desired construction either of wood, sheet metal cylinders as in Figs. 4 and 5, or skeleton construction as well understood in the art, and with the shafts supported in bearings (see Fig. 1) carried by suitable supporting frame structure 4.

For the picking elements, while several of the conventional rubber picking "fingers" as heretofore used on fowl picking machines will operate to a certain degree on the present machine, and others which tend to wrap about the fowls too much will not, I have found the best results in carrying out the process involved is obtained with fingers made of flat strips or preferably individual loops C of flat strips of what is known as "crape" rubber as heretofore used for soling athletes' shoes, as I have discovered that the surface roughness of this particular material combined with its high coefficient of friction even when wet (not possessed by regular rubber) gives a remarkable efficiency in removing feathers with minimum skin injury yet possesses the strength and stiffness to support the fowls up in the air as they are being tumbled about and operated on, and reaches every spot on the fowl so that not even a pin feather nor a hair is to be found anywhere on the fowl when it emerges from the machine.

The picking elements C are preferably spaced a substantial distance apart in spaced rows around the drums A and B as indicated by the development view Fig. 4 and operating between the circular rows of picking elements are the projections 17 of the stripper wheels or disks G or the "fingers" 18 of the rotary strippers F, and which strippers will free or "kick" out any parts of a fowl, such as a leg, wing, or neck which may get caught by the picking elements revolving toward the stripper.

In Fig. 3 the strippers G are shown as comprising a disk 19 secured to a shaft 20 and with a channel shaped rubber tire 21 sprung over the rim of the disk and with spaced projections 17 formed on its periphery. The upper strippers F may be the same as the lower ones G, but as they do very little work since they only aid gravity when a part of a fowl does not fall from drum A they may be simple fingers 18 of rubber or other material projecting from small hubs 22 secured to shaft 23. The drums and strippers are revolved in the directions indicated on the drawing.

In Fig. 5 the machine is shown as with three picker drums K, L, M, which may all be the same size and constructed as set out for drums A and B or otherwise, here indicated as of sheet metal, secured to shafts 2, 3 and 20', respectively, all being revolved in the directions indicated on the drawing.

The strippers shown in this form of the machine may be like those shown and described under G and F for the machine of Fig. 1, but are here shown as stationary combs H with tapered tines 27 positioned between the circular rows of picking elements with their tapered ends arranged tangentially adjacent to the drums as indicated in the drawings.

The gate or gates described on page 3 under designation J, which as stated may or may not be used, depending on the picking time required for particular fowl, are relatively small paddles preferably of fairly stiff rubber or rubber covered metal and which are spaced along the machine as indicated in Fig. 1 at 24 and suitably mounted to move between the circular rows of picking elements into the space between drums A and B, or drums K and L, to block the travel of the fowl therealong in going through the machine. These gates are mounted in any manner to slide in sheet metal slides or guides 24 fixed to the frame structure 4 or to swing on operating shaft 30 to move in and out by any source of power or connection to any moving part of the machine by suitable lever and link connections 25, 26, and any intermittent drive to yield a quick back and forth motion of the gates with a pause at the ends of the stroke may be used, and as indicated at P, driven by any variable speed motor reduction gear drive. The gates may also obviously be operated by hand, and any one or more may be removed or swung out of operative position if desired. One end gate only may be used as previously explained, but the use of several gates spaced along the machine overcomes any tendency for the fowl to crowd up toward the discharge end of the machine. Of course, the angle of inclination of the machine may be changed to slow down or hasten the movement of fowls through it, but the gates, together with a relative steep incline offer a better control.

In operation on chickens and with drum B about 24 inches diameter at outer end of picking element path, revolving about 200 r.p.m., and 11 inch O.D. strippers G 400 r.p.m. and drum A 250 r.p.m. the machine operates perfectly without the fowl becoming jammed. The requirement being that the strippers must be run fast enough to release any fowl tending to ride down around drum B and urge the fowl over to drum A which lifts the fowl into the path of B or to fall into the path of B if carried to stripper F. With large heavier fowl such as large turkeys the size of drums and speeds of rotation may have to be adjusted to maintain the above operation.

In the design of Fig. 5 the third picking drum M aided by comb-stripper H² takes the place of strippers G of Fig. 1 but an additional comb-stripper at H is desirable to release any fowl tending to go around drum M. The three drums of this variation may all rotate at the same speed of about 250 to 375 r.p.m. with drums about the same size as drum B of Fig. 1.

It should be noted that in this machine the picking drum B of Fig. 2, or picking drum L of Fig. 5, does most of the work, and the other drum and strippers cooperate in keeping the fowls in proper relation to the picking drum.

Having thus described my new method of the mechanical defeathering of fowl and some variations in apparatus for practicing the method it is evident that many variations in the arrangement of the rolls or drums and associated parts may be made within the scope of the disclosure and spirit of the invention, and are intended to be covered in the accompanying claims, I therefore claim:

1. In a fowl picker, the combination comprising a rotary drum-like assemblage of circular rows of projecting flexible frictional fowl feather gripping elements, said assemblage arranged in lateral extension to support loose fowl upon said elements for plucking when the assemblage is rotating, and stripper means arranged adjacent said assemblage for stripping away any fowl tending to be carried around with said assemblage, said stripper means provided with portions operatively positioned between rows of said elements and extending in overlapping relation thereto.

2. In a fowl picker, the combination comprising a rotary drum-like assemblage of circular rows of projecting flexible frictional fowl feather gripping elements arranged in lateral extension, to support loose fowl upon said elements for plucking when the assemblage is rotating, and rotary stripper means arranged adjacent said assemblage for combing away any fowl tending to be carried around with said assemblage, said stripper means comprising hub means on a drive shaft, provided with rubber-like radial projections spaced to operate between said rows of elements and extending in overlapping relation thereto so as to engage the fowl.

3. In a fowl picker, the combination comprising a pair of laterally extending elongated cylindrical drums studded with fowl feather picking elements of flexible rubber-like friction material, and means for revolving said drums on their longitudinal axes, said drums being of a diameter and arranged so close together as to substantially support a fowl between them upon their picking elements while being revolved, and stripper means adjacent said drums to prevent fowl being carried around the drums.

4. In a fowl picker, the combination comprising a pair of laterally extending elongated cylindrical drums studded with fowl feather picking elements of flexible rubber-like friction material, and means for revolving said drums on their longitudinal axes, said drums being of a diameter and arranged so close together as to substantially support a fowl between them upon their picking elements while being revolved, said drums being tilted sufficiently to cause the fowl to travel along on said picking elements to the lower ends of the drums for discharge therefrom, and means for controlling the travel of the fowl therealong.

5. In a fowl picker, the combination comprising a plurality of laterally extending elongated cylindrical drums studded with fowl feather picking elements of flexible rubber-like friction material, and means for revolving said drums on their longitudinal axes, said drums being of a diameter and arranged so close together as to substantially support a fowl between them upon their picking elements while being revolved, said cylindrical drums being tilted to cause the fowl to travel along to the lower ends of the drums, and gate means arranged in the path of the fowl travel adapted for holding back the travel of the fowl as desired.

6. In a structure as set out in claim 5, there being a plurality of gates spaced along the path of travel of the fowl and automatic means intermittently opening and closing said gates.

7. In a fowl picker, the combination comprising two laterally extending elongated rotary cylindrical drums studded with fowl feather picking elements of flexible rubber-like friction material, said drums being of a diameter and arranged so close together as to substantially support between them a fowl upon their picking elements while being revolved, a third similar drum extending along under and to obstruct the gap between the two drums, and stripper means adjacent at least two of the drums arranged to prevent the fowl being carried around with the drums, and means for revolving the three drums on their longitudinal axes.

8. In a fowl defeathering machine, the sub-combination of a rotatable assemblage of spaced soft resilient flexible feather engaging picking fingers, means for revolving said assemblage, said assemblage arranged to support loose fowls upon and by the moving fingers by gravity free for tumbling about thereon, and means opposing the free bodily travel of the fowls along with said assemblage, and whereby the fowls are aided in tumbling about on the fingers and the moving picking fingers reach all parts of the fowls to remove the feathers therefrom.

9. In a fowl defeathering machine, the subcombination of a rotatable assemblage of spaced, soft, resilient, flexible, feather engaging picking fingers, means for revolving said assemblage, said assemblage being arranged generally horizontally to support loose fowls upon and by the moving fingers by gravity free for tumbling about thereon, and means opposing, at least intermittently, the free bodily travel of the fowls along with said assemblage and whereby the fowls are aided in tumbling about on the fingers and the moving picking fingers reach all parts of the fowl to remove the feathers therefrom.

References Cited in the file of this patent

UNITED STATES PATENTS

| | | |
|---|---|---|
| 1,081,367 | Cook | Dec. 16, 1913 |
| 1,217,393 | Berg | Feb. 27, 1917 |
| 1,865,492 | Wernberg | July 5, 1932 |
| 2,012,655 | Bowman | Aug. 27, 1935 |
| 2,342,013 | Sandlin | Feb. 15, 1944 |
| 2,472,468 | Digby | June 7, 1949 |
| 2,562,681 | Pine | July 31, 1951 |
| 2,571,034 | Harvey | Oct. 9, 1951 |
| 2,603,830 | Barker | July 22, 1952 |
| 2,641,796 | Johnson | June 16, 1953 |